United States Patent [19]

Blach

[11] Patent Number: 5,803,208

[45] Date of Patent: Sep. 8, 1998

[54] SAFETY ACCESSORY FOR VEHICLES

[75] Inventor: Rainer Blach, Bubesheim, Germany

[73] Assignee: Tripus GmbH Kunststoff- und Elektrotechnik, Bubesheim, Germany

[21] Appl. No.: 792,110

[22] Filed: Jan. 31, 1997

[30] Foreign Application Priority Data

Feb. 1, 1996 [DE] Germany ............... 196 03 657.7

[51] Int. Cl.$^6$ ...................................... B60T 3/00
[52] U.S. Cl. ............................... 188/32; 188/4 R
[58] Field of Search ................ 188/32, 36, 4 R, 188/5

[56] References Cited

U.S. PATENT DOCUMENTS

| | | | |
|---|---|---|---|
| 2,372,703 | 4/1945 | Beegle | 188/36 |
| 3,973,651 | 8/1976 | Garrett et al. | 188/32 |
| 3,992,042 | 11/1976 | Helmick et al. | 188/4 R |
| 3,993,167 | 11/1976 | Reed | 188/32 |

Primary Examiner—Matthew C. Graham
Attorney, Agent, or Firm—Jones, Tullar & Cooper, P.C.

[57] ABSTRACT

Vehicles without their own brakes carry wheel chocks, which are releasably fixed in a holder which can be fastened on the vehicle. With an arrangement of this type it is possible to achieve high operational dependability and cost-effective availability by providing, in the area of the lateral edges of the bottom plate of the wheel chock and the lateral cheeks of the base plate of the holder, a holding device with coupling elements, which can be brought into mutual engagement, which are respectively embodied as insertion bolt and receiving pocket and can be brought into mutual engagement by means of an L-shaped movement with an insertion movement extending perpendicularly in respect to the base plate and a push movement extending in the longitudinal direction of the base plate, and that at least one spring arm projects backward from the base plate of the holder, which has at least one protrusion which reaches around the back edge of the wheel chock when the holding device is brought into engagement and can be taken out of engagement against the spring force of the spring arm.

18 Claims, 3 Drawing Sheets

SAFETY ACCESSORY FOR VEHICLES

FIELD OF THE INVENTION

The present invention relates to a safety accessory for vehicles, and in particular a wheel chock and associated holder, which can be attached to the vehicle. The holder has a base plate which can be fastened to the vehicle, and wherein lateral cheeks, which project away from the base plate, can have the wheel chock between them.

BACKGROUND OF THE INVENTION

Wheeled vehicles which do not have their own brakes, such as trailers, etc., are secured by wheel chocks. Therefore, two wheel chocks are normally taken along with vehicles of this type, each of which can be releasably fixed in a holder attached to the vehicle.

Arrangements of this type have been used for a long time. Up to now the holder was embodied such that a frame-shaped housing for inserting the wheel chock resulted. For this purpose two lateral cheeks of the holder are connected with each other by a bar. A hoop, pivotably seated on bearing pins projecting away from the lateral cheeks, is provided for securing the wheel chock and, when the wheel chock is inserted into the frame-shaped housing, is turned over the upper edge of the housing and placed against its back. The hoop must be manufactured separately from the frame-shaped housing and subsequently mounted on it. The operations required for this arrangement result in comparatively high manufacturing costs. There is the further danger that the hoop and/or the bearing pins will be damaged and/or be torn off, which has a negative effect on functional dependability. In addition, there is the danger of the wheel chock becoming lost if it is not correctly secured. However, a further, very particular disadvantage lies the fact the frame-shaped housing is comparatively unwieldy and therefore requires a comparatively large shipping space. For this reason it is necessary to place layers of a predetermined number of such housing manually into a suitable cardboard box, which also causes not inconsiderable expense.

OBJECT AND SUMMARY OF THE INVENTION

Based on the foregoing, it is an object of the present invention to improve an arrangement noted above while, avoiding the described disadvantages, and to do this in such a way that its cost-effective availability and great functional dependability are assured.

This object is attained in accordance with the present invention in that a fastening device with coupling elements which can be brought into mutual engagement is provided in the area of the lateral edges of the bottom plate of the wheel chock and the lateral cheeks of the base plate of the holder, which are respectively embodied as an insertion bolt and receiving pocket and can which be brought into mutual interlocking engagement by an angled movement including an insertion movement extending perpendicularly with respect to the base plate and a pushing movement extending in the longitudinal direction of the base plate. At least one spring arm projects away from the back of the base plate of the holder, which has at least one protrusion which reaches behind the rear edge of the wheel chock when the holding device has been brought into engagement and can be taken out of engagement against the spring force of the spring arm.

In this way the wheel chock is only held in the area of its bottom plate. Thus, the lateral cheeks of the holder can be embodied as narrow strips. By means of this it is assured that the holder represents a comparatively flat, plate-shaped component. A large number of these components can therefore be loosely piled up in a suitable cardboard box and shipped in this way. Thus a manual packing process can be omitted in an advantageous manner. In addition, a one-piece construction of the holder is achieved in this way. It therefore can be advantageously produced in one operation. Advantageously, no assembly steps are required. Simultaneously, the susceptibility to damage and loss of parts, which happens with the known arrangement, and the resultant functional failures, are prevented in an advantageous manner. The disadvantages described at the outset are therefore avoided by means of the steps in accordance with the present invention and in this way a considerable improvement of the mass-produced article in question is achieved.

Advantageous embodiments and practical further developments are possible. For example, the insertion bolts can be suitably embodied as locking brackets. In an advantageous manner this not only results in great stability, but also allows a simple locking of the direction of rotation.

A further practical development can consist in that the insertion bolts are provided in the area of the lateral edges of the bottom plate of the wheel chock, and the receiving pockets in the area of the lateral cheeks of the base plate of the holder. In this case the insertion bolts can be simply formed as a part of the bottom plate of the wheel chock. It is only necessary for this purpose to appropriately profile the edge of the bottom plate. Thus, extensive changes of the wheel chock can be omitted. At the same time it is assured that the insertion pockets, which are not provided on the wheel chock but on the holder, cannot become soiled when the wheel chock is used.

In an advantageous manner it is possible to provide the lateral cheeks of the base plate of the holder with lateral hooked protrusions which define the receiving pockets. These can be formed on the lateral cheeks in an advantageous manner. At the same time it is assured that, together with the locking brackets, dependable, tilt-proof holding is the result.

In a further development, the base plate can be provided with slide strips extending in the longitudinal direction. This results in a particularly low push resistance when inserting the chock.

A further advantageous step can consist in that the coupling elements provided in the area of both sides of the wheel chock and the holder are offset in the longitudinal direction with respect to each other and/or that in the area of both sides a differing number of coupling elements is provided. It is assured in a simple and obvious manner by means of this that the wheel chock is engaged with the holder in the correct position and that therefore the dependability of holding is not diminished.

A further embodiment, which should be particularly preferred, can consist in that the bottom plate of the wheel chock has lateral recesses of the width of the upper legs of the hooked protrusions of corresponding width constituting the pockets, and that the hooked protrusions defining the receiving pockets are provided on the facing sides of the lateral cheeks embodied as guide strips. By means of this it is assured that the wheel chock does not have a greater width than up to now and therefore also fits in an advantageous manner into present holders. Universal suitability is therefore assured.

In a further development the spring arm can have a tab disposed inside its protrusion. This makes the manual release of the detent projection easier.

The spring arm can suitably rise toward the rear with respect to the contact surface of the base plate of the holder. It is assured in this way that the protrusion catches dependably.

Further advantageous embodiments and practical further developments ensue from the description of examples below.

Some exemplary embodiments of the present invention will be explained in more detail below by means of the drawings.

DETAILED DESCRIPTION OF THE PREFERRED EMBODIMENTS

Figure 1:
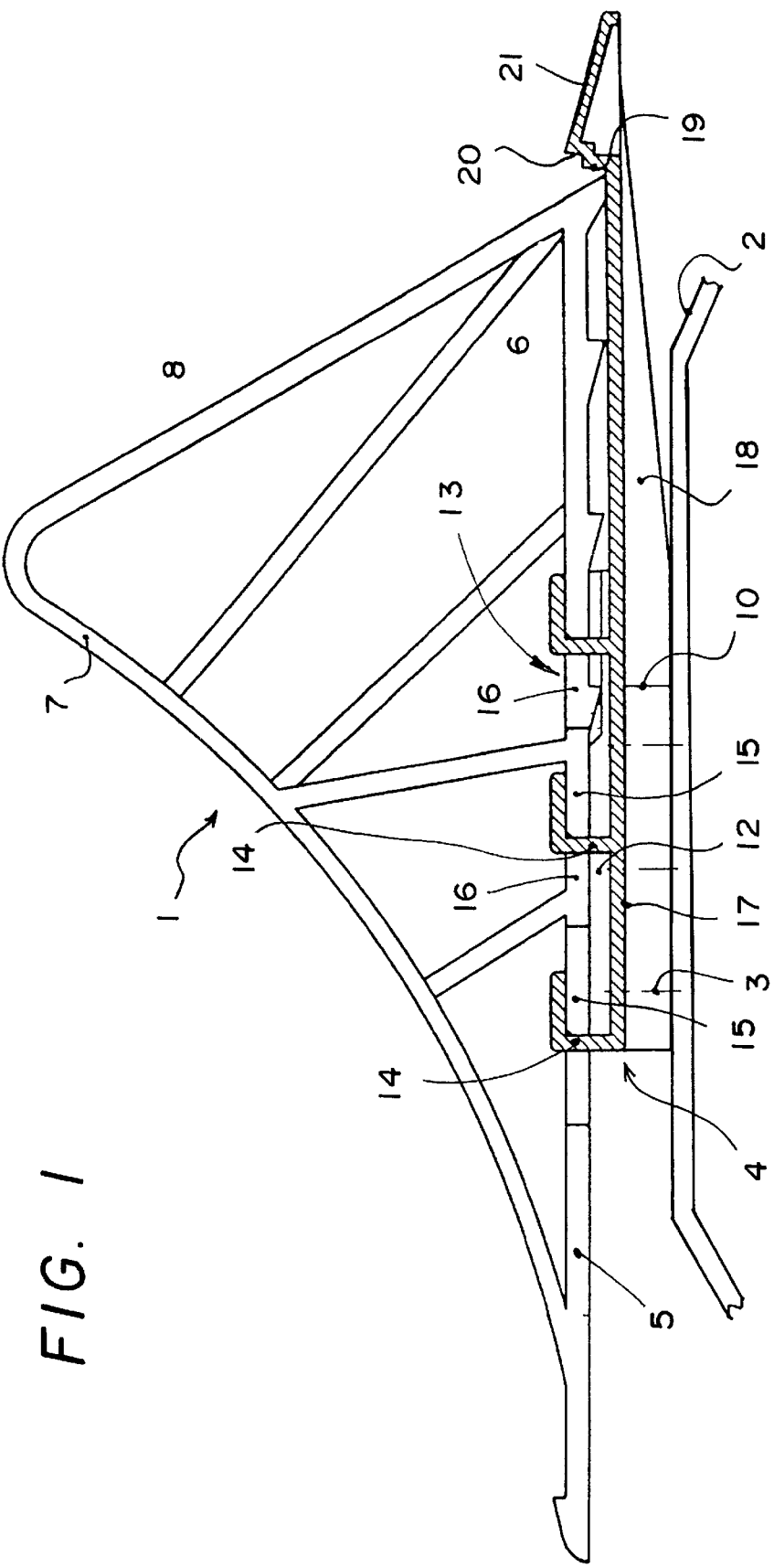
FIG. 1 is a lateral view of a wheel chock received in a holder fastened on a vehicle.

FIG. 1 shows a wheel chock 1 made of a mass-produced plastic such as polyethylene and embodied as an injection-molded blank, which is received in a holder 4 attached on a part 2 of the vehicle, for example a fender, by means of fastening screws 3. The holder 4 is made in one piece and can also be embodied as an injection-molded blank of a mass-produced plastic, such as polyethylene. The wheel chock 1 has a solid bottom plate 5 which has teeth 6 in its rear portion, the teeth 6 increase to sliding resistance, of the chock 1. The chock 1 has a roof-shaped rise, whose front flank 7 is curved to correspond with the curvature of the associated wheel, and whose rear flank 8 constitutes the back of the chock, the chock 1 is reinforced by a central longitudinal rib 23 and several transverse ribs 24.

Figure 2:
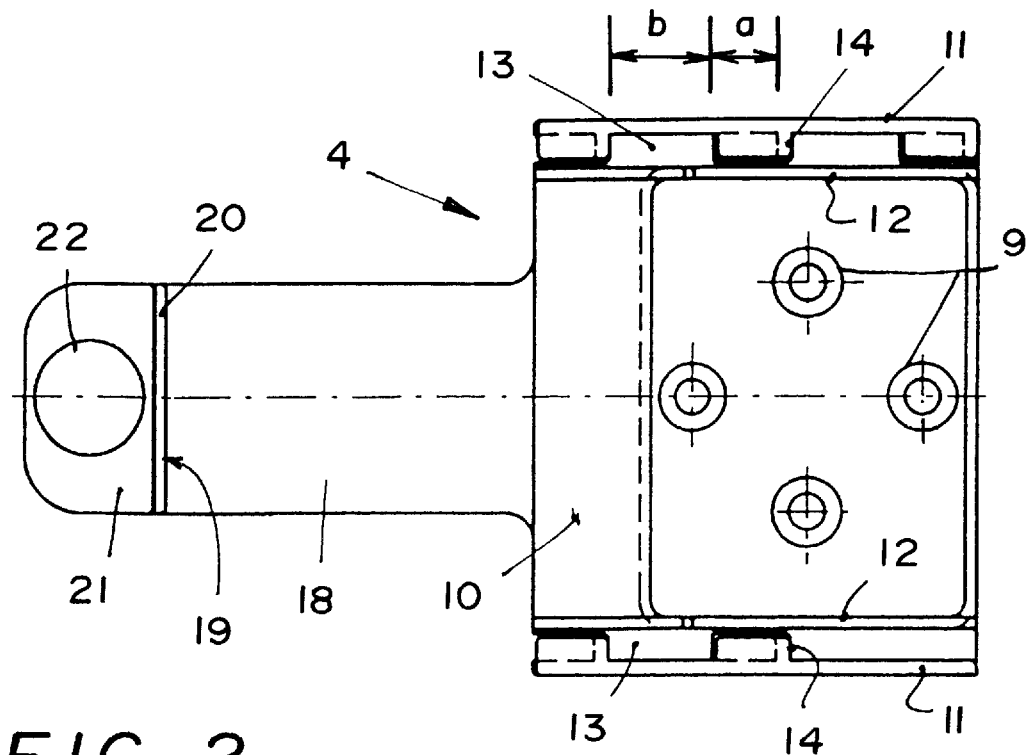
FIG. 2 is a top view of the holder on which the arrangement of FIG. 1 is mounted with receiving pockets located on the inside.
Figure 3:
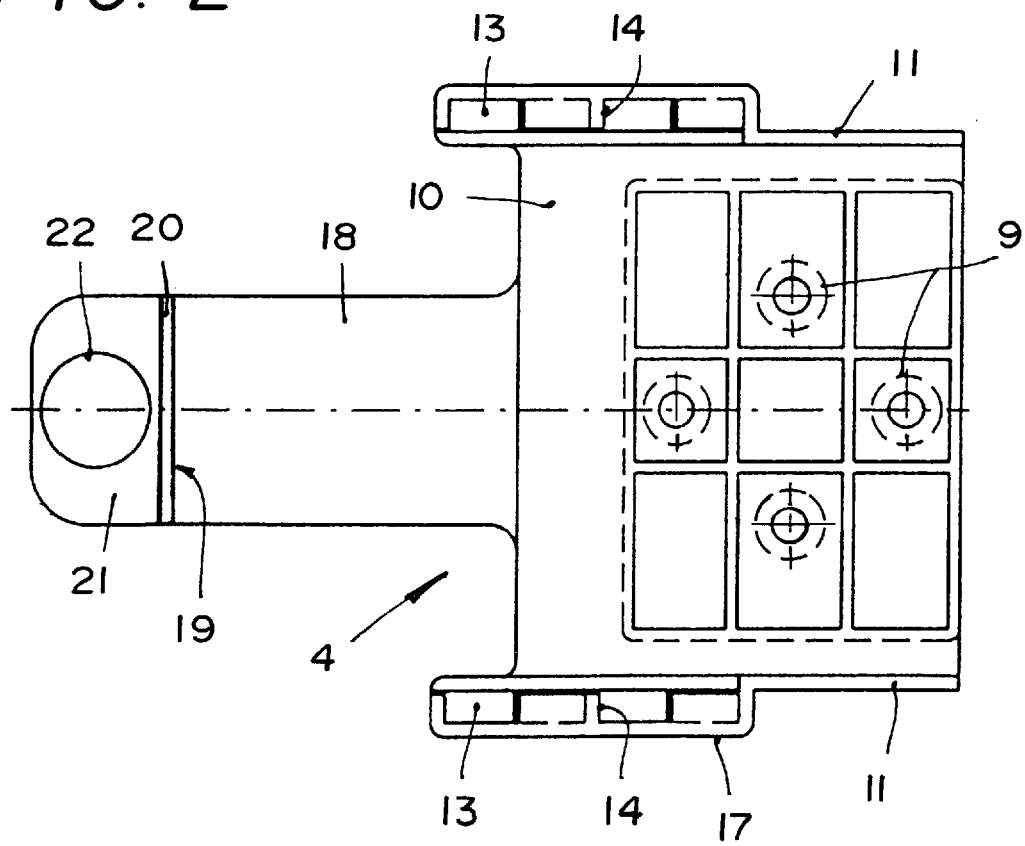
FIG. 3 shows another embodiment of a holder with receiving pockets located on the outside.

As can best be seen in FIGS. 2 and 3, the holder 4 has a base plate 10 provided with bores 9 for the fastening screws 3, on whose upper side facing away from the vehicle part 2 the wheel chock 1 is received. The base plate 10 can be embodied as a solid plate or, as shown in FIG. 3, as a trough reinforced by ribs. Narrow guide strips 11 are provided in the area of the longitudinal edges of the base plate 10, whose height does not or only slightly exceeds the thickness of the bottom plate 5, including the teeth 6. The guide strips 11 between them define a track for pushing in the wheel chock 1. In this case the latter can rest with its large surface on the top of the base plate 10. However, it is also conceivable to provide slide strips raised slightly above the top of the base plate 10 for reducing drag. In the embodiments of FIGS. 1 and 2, two slide strips 12 adjoining the guide strips 11 are provided, whose upper flank defines the support plane for the wheel chock 1, as can be seen in FIG. 1. The slide strips 12 are lower by at least the thickness of the bottom plate 5 than the guide strips 11 and are offset in accordance with the profiling of the underside of the chock formed by the teeth 6, as can be clearly seen in FIG. 1.

The wheel chock 1 and the holder 4 are provided respectively on the bottom plate 5 and the base plate 10 with coupling elements, which can be brought into mutual fastening engagement. To this end the holder 4 is provided with receiving pockets 13 disposed in the area of its lateral guide strips 11. They are constituted by lateral hooked protrusions 14. As can best be seen in FIG. 1, by means of the latter an engagement area is defined, which is bordered at the top by their upper legs and at the front by their front legs and is adjoined by an insertion area accessible from above.

Figure 4:
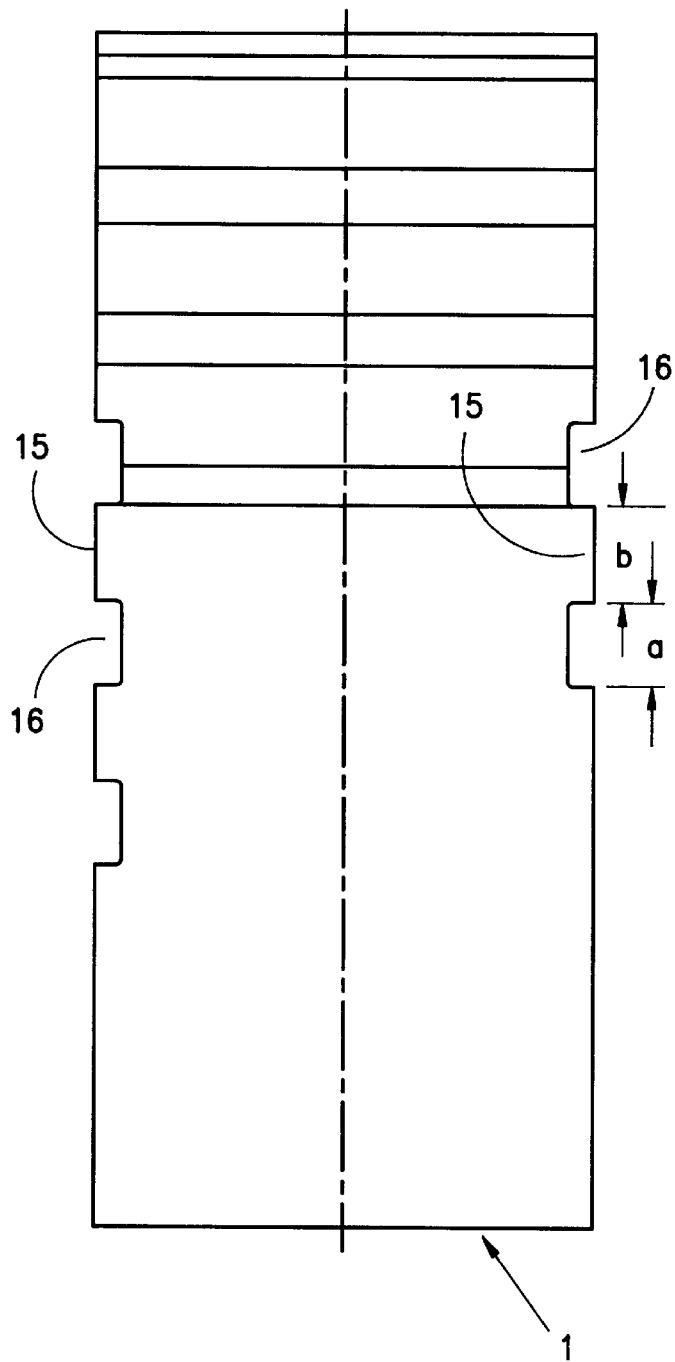
FIG. 4 is a view from below of the wheel chock matching the holder of FIG. 2.
Figure 5:
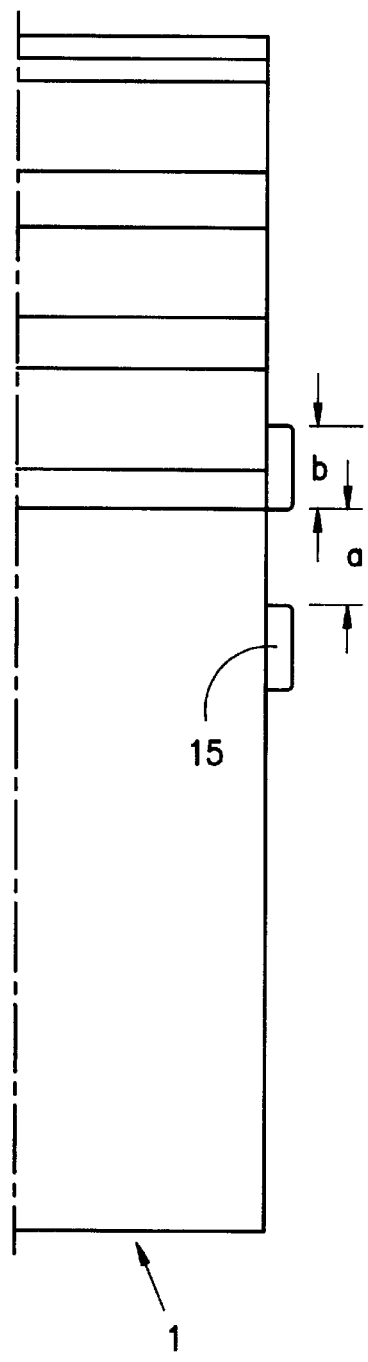
FIG. 5 is a view from below of the wheel chock matching the holder of FIG. 3.

As realized in the embodiment in accordance with FIG. 2, the receiving pockets 13 can be placed in the area of the insides of the guide strips 11 facing each other or, as realized in the embodiment in accordance with FIG. 3, in the area on the outsides of the guide strips 11 facing away from each other. The coupling elements provided on the chock side are accordingly differently designed, as shown in FIGS. 4 and 5. In any case, locking brackets 15, which can be inserted into the receiving pockets 13, are provided in the area of the lateral flanks of the bottom plate 5. If, as shown in FIG. 2, the receiving pockets 13 are disposed on the inside of the guide strips 11, the locking brackets 15 need not laterally protrude past the edges of the bottom plate 5 and thus of the wheel chock 1, as clearly shown in FIG. 4. In this case the bottom plate 5 can be simply provided with lateral edge recesses 16 to form the locking brackets 15, which are placed at such a distance from each other that the desired locking brackets 15 remain. Here a tooth-shaped edge profile of the bottom plate 5 without lateral protrusions is the result.

If, as shown in FIG. 3, the receiving pockets 13 are disposed on the outside of the guide strips 11, and the locking brackets 15 are embodied as protrusions which project past the lateral edges of the bottom plate 5 and thus of the wheel chock 1. The total width of the wheel chock is increased by this, which, on the one hand, results in an increased displacement resistance, but on the other hand prevents such a wheel chock from being received in the holder of the construction used up to now.

As FIG. 1 shows, the thickness of the locking bracket 15 corresponds to the thickness of the bottom plate 5. The width b of the locking brackets 15 is less by a sufficient amount of play than the clear width of the insertion area of the receiving pockets 13. The mutual distance a of the locking brackets 15 corresponds to the width of the upper leg of the hooked protrusions 14 plus a sufficient amount of play. The total length of the receiving pockets 13 therefore corresponds approximately to the sum of the measurements a and b.

The receiving pockets 13 can be closed toward the outside. With the embodiment in accordance with FIG. 2, such a closure occurs automatically because of the guide strips 11. An exterior cover 17 is provided in the embodiment in accordance with FIG. 3. The receiving pockets 13 can also be closed toward the bottom, i.e. on the side of the base plate, as can best be seen from FIG. 1. For technical production reasons the pocket bottom 17 can be recessed in the area of the upper legs of the hooked protrusions 14, because the injection mold requires a slide at this point for forming the hooked protrusions 14. The clear height of the receiving pockets 13, i.e. the distance of the upper legs of the hooked protrusions 14 from the oppositely situated support plane on which the bottom plate 5 of the wheel chock comes to rest, corresponds at least to the thickness of the locking brackets 15 and correspondingly to the thickness of the bottom plate 5. If slide strips 12 are provided, the clear distance between their upper flank and the upper leg of the hooked protrusions 14 corresponds to the thickness of the locking brackets 15, as can be seen from FIG. 1.

With the chock of FIG. 4, the number of the locking brackets 15 provided is different on both sides.

Correspondingly, the number of receiving pockets 13 provided on both sides of the associated holder 4, which is the basis for FIG. 2, is also different. Because of this the wheel chock 1 can only be inserted in the correct position into the associated holder 4, so that damage is prevented and dependable holding is assured. In addition to or alternatingly to this it is also possible to arrange the locking brackets 15 or receiving pockets 13 respectively provided on both sides offset from each other in the longitudinal direction. The same also applies of course to the embodiment in accordance with FIGS. 3 and 5.

To receive the wheel chock 1 in the holder 4, the wheel chock 1 is seated on the holder 4 with the bottom plate 5 facing the base plate 10 of the holder 4 in such a way, that its locking brackets 15 coincide with the inserting areas of the associated receiving pockets 15. Accordingly, the locking brackets 13 can be lowered into the associated receiving pockets 13 by a movement perpendicular with the base plate 10. Subsequently the wheel chock 1 and accordingly its locking brackets 15 are displaced toward the front parallel with the base plate, until the locking brackets 15 come to rest against the front legs of the hooked protrusions 14 acting as limit stops. In the process a, the locking brackets 15 are partially covered by the upper legs of the hooked protrusions 14. FIG. 1 is based on this engaged position. A tilt-proof arrangement is assured because of the level contact of the locking brackets 15 with the slide strips 12 on the one side and on the upper legs of the hooked protrusions 14 on the other.

This engaged position is secured by a detent device. To this end the holder 4 is provided with a spring arm 18 projecting backward from its base plate 10, which has an upwardly projecting detent projection 19 in the area of its rear end which, in the engaged position on which FIG. 1 is based, extends behind the rear edge of the wheel chock 1. To release the detent connection, the spring arm 18 is bent downward against its spring force until the detent projection 19 comes out of engagement with the rear edge of the wheel chock 1. The spring arm 18 accordingly is designed and/or housed in such a way that there is sufficient free deformation play which, in the example represented, is achieved by the thickness of the spring arm 18 being reduced toward the back in respect to the greater thickness of the base plate 10.

To assure that the detent projection 19 dependably remains in the desired detent position, the spring arm 18 can be embodied such that it slightly rises toward the back in the unstressed state, from which a prestress of the spring arm 18 results in the engaged position which is the basis for FIG. 1, because of which the detent projection 19 is dependably maintained in engagement and at the same time counteracts rattling of the wheel chock 1. The engagement edge of the detent projection 19 is provided with a step 20, open toward the top, which results in a two-stage detent and accordingly increases the assurance against automatic release. To make the manual release of the detent connection easier, the detent projection 19 is embodied as a comparatively wide tooth, so that a wide tab 21 behind the detent edge results. As FIGS. 2 and 3 show, it can be provided with a thumb rest 22.

In the above described examples the locking brackets 15 are associated with the wheel chock 1 and the receiving pockets 13 with the holder 4. However, the reverse association would also be conceivable, although the association on which the represented examples are based simplifies the manufacture, especially that of the wheel chock 1.

I claim:

1. A safety accessory on a vehicle, comprising:
   at least one holder which is attached to the vehicle;
   a wheel chock associated with each holder, said wheel chock having a bottom plate defining lateral edges;
   each said holder including a base plate which is attached to the vehicle, said base plate having cheeks which project away from said base plate, said cheeks defining lateral edges and serving to receive between them said associated wheel chock, and at least one spring arm which projects away from the back of said base plate, said at least one spring arm including at least one protrusion; and
   fastening means comprising coupling elements which are mutually engaged for fastening said wheel chock to its associated holder, said fastening means being provided in the area of the lateral edges of said bottom plate and the lateral edges of said cheeks, said coupling elements each comprising an insertion bolt and an associated receiving pocket, said insertion bolt being brought into mutual interlocking engagement with its associated receiving pocket by an L-shaped relative movement, with an insertion movement extending perpendicularly to said base plate and a pushing movement extending in the longitudinal direction of said base plate,
   wherein said at least one protrusion reaches behind a rear edge of its associated wheel chock when said wheel chock is brought into engagement with its associated holder, and said wheel chock is removed from its associated holder by movement against the spring force of said at least one spring arm.

2. The safety accessory as defined in claim 1, wherein said insertion bolts are embodied as locking brackets.

3. The safety accessory as defined in claim 1, wherein said insertion bolts are provided in the area of the lateral edges of said bottom plate, and said receiving pockets are provided in the area of said base plate.

4. The safety accessory as defined in claim 1, wherein said cheeks are embodied as narrow guide strips.

5. The safety accessory as defined in claim 1, wherein said receiving pockets are defined by lateral hooked protrusions.

6. The safety accessory as defined in claim 5, wherein the length of said receiving pockets is greater by at least the width of said insertion bolts than the width of the legs of said hooked protrusions.

7. The safety accessory as defined in claim 1, wherein said receiving pockets are locked on the outside of said holder facing away from each other.

8. The safety accessory as defined in claim 1, wherein said receiving pockets are closed, at least in their insertion area on the side of said base plate.

9. The safety accessory as defined in claim 1, wherein said base plate is provided with slide strips extending in the longitudinal direction.

10. The safety accessory as defined in claim 1, wherein the width between the upper support plane of said base plate and the oppositely situated upper limit of said receiving pockets corresponds to the thickness of said insertion bolts.

11. The safety accessory as defined in claim 1, wherein said insertion bolts are offset in the longitudinal direction with respect to each other.

12. The safety accessory as defined in claim 1, wherein said receiving pockets are offset in the longitudinal direction with respect to each other.

13. The safety accessory as defined in claim 1, wherein the number of insertion bolts and associated receiving pockets provided on each side of said wheel chock and holder is different.

14. The safety accessory as defined in claim 1, wherein said bottom plate has lateral edge recesses for forming said insertion bolts, and wherein said receiving pockets are provided in the area of inside of said guide strips which face each other.

15. The safety accessory as defined in claim 1, wherein each said spring arm has a tab disposed behind a protrusion.

16. The safety accessory as defined in claim 1, wherein each said spring arm rises in relation to the support plane of said base plate.

17. The safety accessory as defined in claim 1, wherein the protrusion of each spring arm has a step.

18. The safety accessory as defined in claim 1, wherein said holder is embodied as a one-piece plastic injection-molded blank.

* * * * *